Oct. 2, 1951 P. F. SPREMULLI 2,570,079
GLASS STIRRER AND FEEDER
Filed Feb. 9, 1950
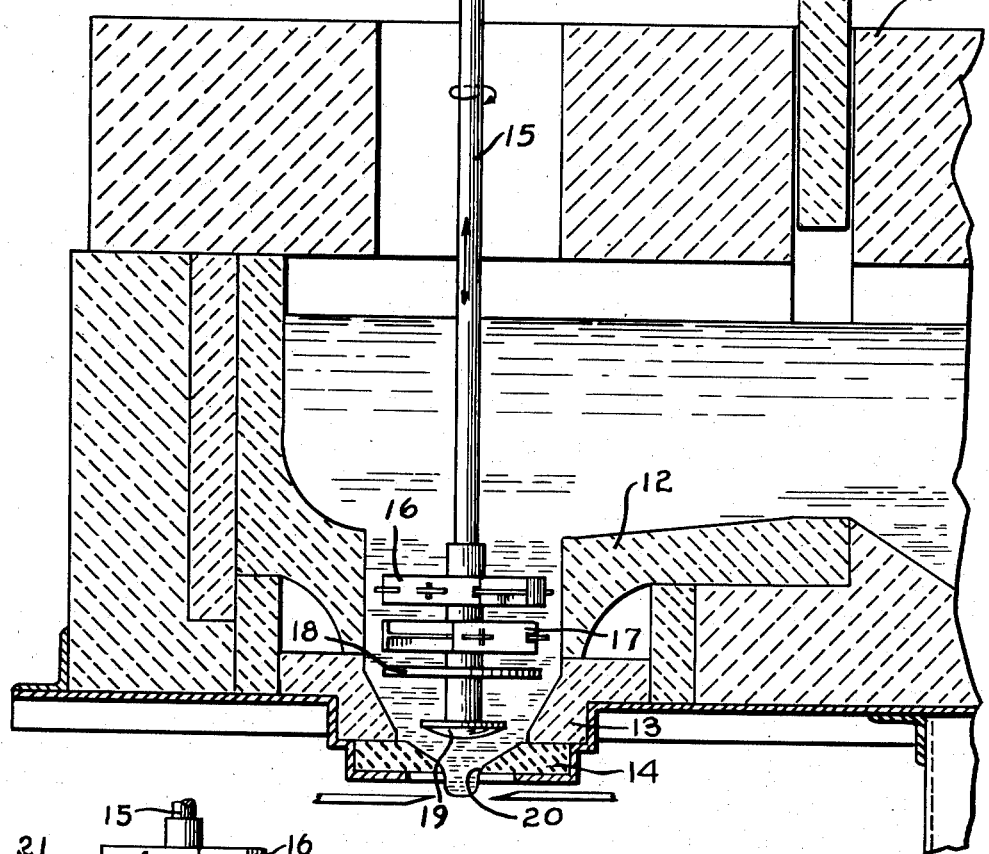
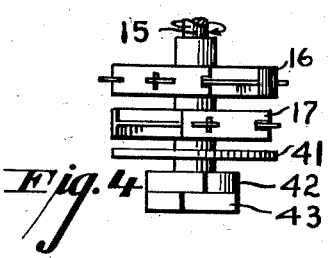
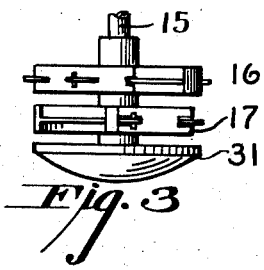
INVENTOR.
PAUL F. SPREMULLI
BY
ATTORNEY

UNITED STATES PATENT OFFICE 2,570,079

GLASS STIRRER AND FEEDER

Paul F. Spremulli, Corning, N. Y., assignor to Corning Glass Works, Corning, N. Y., a corporation of New York Application February 9, 1950, Serial No. 143,274

9 Claims. (Cl. 49—55)

The present invention relates to stirring and feeding apparatus for molten glass, and is particularly concerned with the provision of facilities for thoroughly stirring glass just before its extrusion from the bottom outlet of a feeder bowl. The invention may be considered to be in the nature of an improvement on the glass-stirring apparatus generally disclosed in DeVoe application Serial No. 609,876, filed August 9, 1945. As described in that application, the quality of molten glass can be improved by feeding it to the upper end of a cylinder containing a rotating stirrer, from the bottom end of which the glass flows by gravity alone or by gravity and certain pumping action of the stirrer itself.

It has since been discovered that such a stirrer confined in a cylinder over a bottom outlet therein of a diameter less than the lateral spread of the stirrer can successfully be used to periodically extrude charges of glass through the bottom outlet by, from time to time, axially displacing the stirrer within the cylinder toward the outlet. It has been further found that a better exercise of control of the flow of glass through the outlet, and of the control of the extrusion of glass therethrough, is possible if certain additions are made to the lower end of the stirrer assembly.

The prime object of the present invention, therefore, is to provide a stirrer in a housing of the foregoing general type with one or more additional elements which will better facilitate it for feeding from such housing.

Another object of the invention is to provide, for use with a stirrer in a housing of the foregoing character, a choice of one or more auxiliary elements which better facilitate its use in the extrusion of mold charges from the outlet of such housing.

In the accompanying drawing Fig. 1 is a sectional view in elevation of a fragment of a conventional forehearth provided with a glass-feeding bowl including a cylindrical housing containing a stirrer embodying one form of the invention.

Figs. 2, 3, and 4 are elevational views of the stirrer of Fig. 1, each with a different embodiment of the invention associated therewith.

Referring now to the drawing in detail, the forehearth 11 is provided with a generally cylindrically shaped glass-feeder housing formed by upper member 12, intermediate member 13, and outlet member 14. As shown in Fig. 1, members 13 and 14 are so shaped as to provide a surface sloping downwardly and inwardly toward outlet 20 in member 14. A stirrer is axially arranged over outlet 20 and is supported on the lower portion of a shaft 15 and, by way of example, may comprise sets 16 and 17 of impeller elements, which may be of the general form shown in Fig. 3 of the referred-to DeVoe application. Impeller set 17 is adapted to impart a thrust to molten glass encountered by it toward the boundary of the housing while the shaft is rotated in the direction indicated, and set 16 is adapted to at such time impart a pulling action on the glass toward the axial center of such space.

In accordance with the present invention, a circular disc or plate 18 of a diameter substantially the distance of lateral spread of impeller sets 16 and 17 is arranged on shaft 15 a short distance below impeller set 17. The end of shaft 15 is provided with a much smaller sphericalbottomed disc or plate 19. This combination of a large-diameter plate and a smaller diameter plate is particularly useful in the feeding of rather viscous glass in a fairly wide range of large-volume gob weights when the stirrer assembly is moved axially toward outlet 20.

The separate plates 18 and 19 may be replaced by a unitary flow-control element such as element 21 of Fig. 2. The element 21, as shown, is in the form of an inverted truncated cone having its truncated portion spherical. This form of element gives better control of the feeding of more fluid glass than is obtained by the use of a stirrer equipped with plates such as 18 and 19, but does not permit as great a volume of glass to pass.

The stirrer of Fig. 3 is equipped with but a single circular plate or disc 31 of a diameter substantially equal to the lateral spread of the impeller sets. The undersurface of plate 31, however, is made spherical. This form of element is preferred for use at glassworking positions at which only the delivery of large-weight gobs of rather viscous glass is required.

The stirrer of Fig. 4 is provided with a plain, flat circular plate or disc 41 below which is an auxiliary stirrer unit that may consist, as shown, of an impeller set 43 curved to impart an outward thrust to the glass, and an impeller set 42 curved to impart an inward pull on the glass. The impeller sets 42 and 43 may be similar in form to impeller sets 16 and 17. This form of structure is of particular utility when the glass being worked is especially corrosive and picks up constituents from the stirrer. The auxiliary stirrer elements 42 and 43, in addition to aiding in the feed control as accomplished by plate 19, serve to effectively disperse such constituents in the issuing glass in a manner to render them substantially invisible in the finished ware produced therefrom.

As indicated above, the particular form which the flow-control element takes for a given installation is governed by such considerations as the viscosity of the molten glass, the weight of the gob to be produced, and the frequency at which it is desired to deliver the gobs. Moreover, the portion of the housing adjoining bottom outlet 20 is so shaped as to provide, in conjunction with such flow-control element and the stirrer itself, the desired control over the extrusion of the glass through such outlet.

With regard to the form of flow-control element shown in Fig. 1, the diameter of plate 18 may be somewhat larger or somewhat smaller than the lateral spread of impeller sets 16 and 17, as conditions may require. The ratio of the diameter of plate 19 to that of plate 18 may similarly vary, as well as the spacing between such plates. While plate 19 may be entirely flat, it is advantageously spherically shaped on its underside as shown in order to avoid the formation of blisters on the end of the shaft.

Similar comments apply to the forms of the flow-control element shown in Figs. 2-4. While the truncated portion of the inverted cone-shaped element 21 of Fig. 2 and the underside of plate 31 in Fig. 3 may be flat, they are preferably spherically shaped, as shown, for the reason indicated above. Moreover, the flow-control element is preferably spaced somewhat along the shaft from the stirrer itself, and its top surface is desirably planar in order to avoid any tendency toward the accumulation of bubbles on the upper surface thereof.

The maximum diameter of the flow-control element may vary considerably in accordance with the particular feeding installation, and will be greater than the diameter of the shaft. Preferably, however, as shown in the several modifications described above, such diameter is generally substantially equal to the lateral spread of at least the stirring elements positioned immediately thereabove.

What is claimed is:

1. In an apparatus suitable for stirring and feeding glass, a housing embodying a vertical generally cylindrical space having a bottom outlet in its axial center which is substantially smaller than the bore diameter thereof, means for maintaining said cylindrical space full of molten glass while glass is being issued from the bottom outlet, a continuously rotatable and axially reciprocable shaft within and coaxial with said cylindrical space, stirring elements radially projecting from said shaft within said cylindrical space, and means carried by the lower end of said shaft below the stirring elements and comprising a member of a substantially greater diameter than said shaft, the portion of the housing adjoining the outlet being so shaped that said member, in cooperation therewith and with the stirring elements, serves to control the issuance of glass through said outlet.

2. An apparatus such as defined by claim 1, wherein said member comprises a substantially circular plate or disc of greater diameter than the shaft.

3. An apparatus such as defined by claim 2, wherein the diameter of the circular plate or disc is substantially the same as the lateral spread of the stirring elements.

4. An apparatus such as defined by claim 3, wherein said circular plate or disc is positioned at the end of the shaft and its lower surface is spherically shaped.

5. An apparatus such as defined by claim 1, wherein said member is in the form of an inverted truncated cone whose base has a diameter approximating the lateral spread of the stirring elements.

6. An apparatus such as defined by claim 5, wherein the truncated end of the cone is spherical.

7. An apparatus such as defined by claim 1, wherein said member comprises a circular plate or disc of greater diameter than the shaft, and a smaller diameter plate or disc, is positioned at the end of the shaft and spaced from the larger diameter plate.

8. An apparatus such as defined by claim 7, wherein the bottom surface of the smaller diameter plate or disc is spherical.

9. An apparatus such as defined by claim 1, wherein said member comprises a circular plate or disc and auxiliary stirring elements are arranged on the end of the shaft below said plate or disc, the diameter of said plate or disc being greater than the lateral spread of said auxiliary stirring elements.

PAUL F. SPREMULLI.

REFERENCES CITED

The following references are of record in the file of this patent:

UNITED STATES PATENTS

| Number | Name | Date |
| --- | --- | --- |
| 1,084,210 | Howard | Jan. 13, 1914 |
| 1,603,221 | Thomson | Oct. 12, 1926 |
| 1,678,291 | Howard | July 24, 1928 |
| 1,737,525 | Soubier | Nov. 26, 1929 |
| 1,778,775 | Soubier | Oct. 21, 1930 |
| 1,852,218 | Peiler | Apr. 5, 1932 |
| 1,884,427 | Wardley | Oct. 25, 1932 |
| 2,009,793 | Sanchez-Vello | July 30, 1935 |
| 2,100,760 | Wadsworth | Nov. 30, 1937 |